United States Patent
Park et al.

(10) Patent No.: US 12,538,391 B2
(45) Date of Patent: Jan. 27, 2026

(54) INDUCTION HEATING APPARATUS AND METHOD FOR CONTROLLING THE SAME

(71) Applicant: LG ELECTRONICS INC., Seoul (KR)

(72) Inventors: Wongyu Park, Seoul (KR); Bada Yoon, Seoul (KR); Sihoon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1016 days.

(21) Appl. No.: 17/579,761

(22) Filed: Jan. 20, 2022

(65) Prior Publication Data
US 2022/0232673 A1 Jul. 21, 2022

(30) Foreign Application Priority Data

Jan. 20, 2021 (KR) .................. 10-2021-0008193
Jan. 17, 2022 (KR) .................. 10-2022-0006854

(51) Int. Cl.
*H05B 6/06* (2006.01)
*H05B 6/08* (2006.01)
*H05B 6/12* (2006.01)

(52) U.S. Cl.
CPC .............. *H05B 6/065* (2013.01); *H05B 6/08* (2013.01); *H05B 6/1245* (2013.01)

(58) Field of Classification Search
CPC .......... H05B 6/062; H05B 6/065; H05B 6/08; H05B 6/1245
See application file for complete search history.

(56) References Cited

U.S. PATENT DOCUMENTS

| | | | |
|---|---|---|---|
| 3,898,410 | A | 8/1975 | Peters, Jr. |
| 4,112,287 | A | 9/1978 | Oates et al. |
| 2003/0205572 | A1 | 11/2003 | Bassill et al. |

(Continued)

FOREIGN PATENT DOCUMENTS

| | | |
|---|---|---|
| EP | 1935213 | 1/2009 |
| EP | 2172081 | 9/2014 |

(Continued)

OTHER PUBLICATIONS

Extended European Search Report dated Jun. 17, 2022 issued in Application 22152397.0.

(Continued)

*Primary Examiner* — Quang T Van
(74) *Attorney, Agent, or Firm* — KED & ASSOCIATES, LLP

(57) ABSTRACT

The present disclosure relates to an induction heating apparatus and a method for controlling the same. In one embodiment, when a power level of a heating zone is input, a noise suppressing operation may be performed to suppress initial driving noise that might occur before a frequency for heating a container. A controller of the induction heating apparatus may adjust duty cycles of switching signals input to switching elements included in an inverter circuit and a driving frequency of the inverter circuit respectively and perform the noise suppressing operation. In the embodiment, when a power level of a heating zone is set and a container starts to be heated, initial driving noise may be reduced.

14 Claims, 14 Drawing Sheets

(56) References Cited

U.S. PATENT DOCUMENTS

2008/0049470 A1* 2/2008 Ishio ..................... H05B 6/062
363/78
2014/0197160 A1 7/2014 Shan et al.

FOREIGN PATENT DOCUMENTS

| EP | 2330866 | 11/2016 |
|---|---|---|
| EP | 3291643 | 12/2018 |
| GB | 2 348 750 A | 10/2000 |
| JP | H 0612706 | 2/1994 |
| JP | 2003257604 | 9/2003 |
| KR | 10-2018-0002247 | 1/2018 |
| KR | 10-2142411 | 8/2020 |
| KR | 10-2020-0129002 | 11/2020 |
| KR | 10-2201189 | 1/2021 |

OTHER PUBLICATIONS

Korean Office Action dated Apr. 8, 2025, issued in Application No. 10-2022-0006854.
European Office action dated Apr. 28, 2025, issued in Application No. 22152397.0.
"Induction Heating System Topology Review". AN9012, by Fairchild Semiconductor, Rev. D. Jul. 2000.
"Induction Cooking—Everything You Need to Know", AND9166/D, by Semiconductorcomponents Industries, Rev. 2, Oct. 2014.

* cited by examiner

INDUCTION HEATING APPARATUS AND METHOD FOR CONTROLLING THE SAME

CROSS-REFERENCE TO RELATED APPLICATION

This application claims priority to and the benefit of Korean Patent Application No. 10-2021-0008193, filed in Korea on Jan. 20, 2021, and Korean Patent Application No. 10-2022-0006854, filed in Korea on Jan. 17, 2022, the disclosure of which are incorporated herein by reference in its entirety.

BACKGROUND

1. Field

Disclosed herein are an induction heating apparatus and a method for controlling the same.

2. Background

Induction heating apparatuses are devices that generate eddy current in a metallic container and heat the container, using a magnetic field generated around a working coil. When an induction heating apparatus is driven, alternating current is supplied to the working coil. An induced magnetic field is generated around the working coil disposed in the induction heating apparatus. When magnetic line of force of the induced magnetic field generated passes through a bottom of the metallic container over the working coil, eddy current is generated inside the bottom of the container. Accordingly, the eddy current generated flows in the container, and the container itself is heated.

FIG. 1 is a view showing a waveform of alternating current supplied to a working coil when a container is heated by an induction heating apparatus of the related art. In FIG. 1, time point P1 is a time point at which a power level of a heating zone of the induction heating apparatus is set, an instruction to initiate heating is input, and current starts to flow in the working coil corresponding to the heating zone.

When a user sets a power level and inputs an instruction to initiate heating in a state in which a container is placed in (or provided on) the heating zone, an inverter circuit generates alternating current as a switching signal is supplied to the inverter circuit electrically connected to the working coil, at time point P1. Accordingly, the alternating current generated by the inverter circuit is supplied to the working coil.

After the AC current starts to be supplied to the working coil at the time point P1, the peak values of the AC current supplied to the working coil until the time point P2 are maintained at IA1 and IA2, respectively. Accordingly, the amount of change in the alternating current supplied to the working coil (i.e., a peak-to-peak value) is maintained at IA1-IA2 in the period of P1-P2.

After the alternating current starts to be supplied to the working coil at time point P1, a controller of the induction heating apparatus controls the inverter circuit to match an output power value of the working coil and a required power value corresponding to the power level set by the user. In FIG. 1, time point P3 is a time point at which the working coil outputs power having the same value as the required power value.

By the way, while the output power value of the working coil is adjusted, a range of the alternating current supplied to the working coil can increase temporarily. For example, in the period of P2-P3 of FIG. 1, the peak value of the alternating current supplied to the working coil increases to IA3 greater than IA1 and decreases to IA4 less than IA2. Accordingly, a change in the amount of the alternating current supplied to the working coil in the period of P2-P3 is IA3-IA4. The change of IA3-IA4 is greater than the change of IA1-IA2 of the alternating current supplied to the working coil in the period of P1-P2.

When the output power value of the working coil matches the required power value at time point P3, the peak value of the alternating current supplied to the working coil is maintained at IA5 and IA6 respectively.

As magnitude of the current supplied to the working coil increases, noise generated by the working coil increases. In the related art, during an initial process in which the induction heating apparatus starts a heating operation, the peak-to-peak value of the current supplied to the working coil can increase excessively and instantly in the period (e.g., period P2-P3) that is earlier than the time point at which the output power value of the working coil matches the required power value.

As described above, when the instruction to initiate heating is input and the container starts to be heated, an excessively loud noise can be generated due to an instant increase in the peak-to-peak value of the current supplied to the working coil, as described above. The initial driving noise can cause inconvenience to the user each time the user uses the induction heating apparatus, and in some cases, the user can wrongly think that the induction heating apparatus fails.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
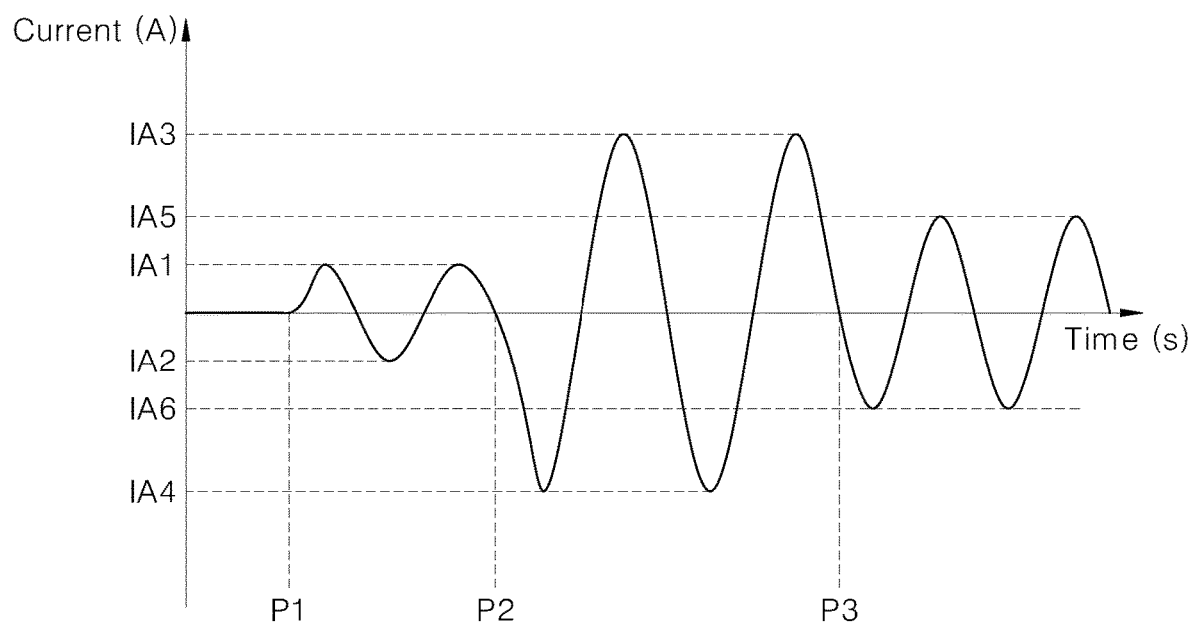
FIG. 1 is a view showing a waveform of alternating current supplied to a working coil when a container is heated by an induction heating apparatus of the related art.

The above-described aspects, features and advantages are specifically described hereunder with reference to the accompanying drawings such that one having ordinary skill in the art to which the present disclosure pertains can easily implement the technical idea of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
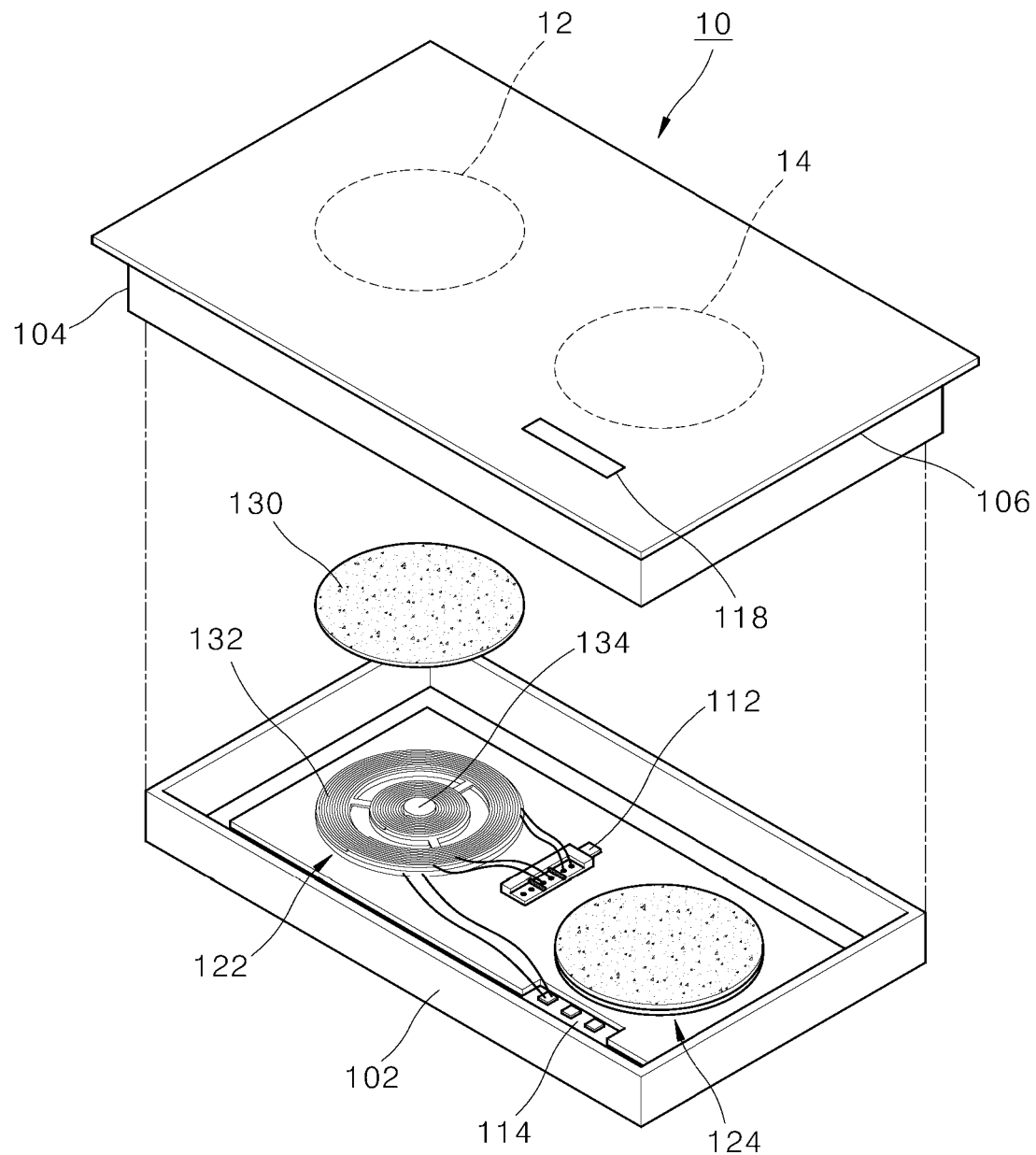
FIG. 2 is an exploded perspective view showing an induction heating apparatus in one embodiment.

FIG. 2 is an exploded perspective view showing an induction heating apparatus in one embodiment. An induction heating apparatus 10 in one embodiment may include a case 102 constituting a main body, and a cover plate 104 coupled to the case 102 and sealing the case 102.

The cover plate 104 may be coupled to an upper surface of the case 102 and seal a space, formed inside the case 102, from the outside. The cover plate 104 may include an upper plate 106 on which a container for cooking a food item is placed. In one embodiment, the upper plate 106 may be made of tempered glass such as ceramic glass. However, a material for the upper plate 106 may vary depending on embodiments.

Heating zones 12, 14 respectively corresponding to working coil assemblies 122, 124 may be formed on the upper plate 106. For a user to recognize positions of the heating zones 12, 14 easily, lines or figures corresponding to the heating zones 12, 14 may be printed or displayed on the upper plate 106.

The case 102 may be formed into a cuboid, an upper portion of which is open. The working coil assemblies 122, 124 for heating a container may be disposed in the space formed inside the case 102. Additionally, an interface 114 may be disposed inside the case 102, and the interface 114 may allow the user to supply power or be used to adjust a power level of each of the heating zones 12, 14, and display information on the induction heating apparatus 10. The interface 114 may be implemented as a touch panel that is capable of inputting and displaying information at the touch of the touch panel. However, an interface 114 having a different structure may be used depending on embodiments.

Additionally, on the upper plate 106, a manipulation zone 118 may be disposed in a position corresponding to a position of the interface 114. For the user's manipulation, characters or images and the like may be printed in the manipulation zone 118, in advance. The user may perform desired manipulation by touching a specific point of the manipulation zone 118 with reference to the characters or images that are printed in the manipulation zone 118 in advance. Additionally, information output by the interface 114 may be displayed through the manipulation zone 118.

The user may set a power level of each of the heating zones 12, 14 through the interface 114. The power level may be displayed in the manipulation zone 118 as numbers (e.g., 1, 2, 3, . . . , 9). When a power level of each of the heating zones 12, 14 is set, a required power value and a heating frequency of a working coil corresponding to each of the heating zones 12, 14 may be determined. A controller may drive each working coil, based on the determined heating frequency, such that an actual output power value of each working coil matches a required power value set by the user.

A power supply 112 (or power supply device) for supplying power to the working coil assemblies 122, 124 or the interface 114 may be disposed in the space formed inside the case 102.

In the embodiment of FIG. 2, two working coil assemblies (i.e., a first working coil assembly 122 and a second working coil assembly 124) are disposed inside the case 102, for example. However, three or more working coil assemblies may be disposed inside the case 102, depending on embodiments.

The working coil assemblies 122, 124 may include a working coil that forms an induced magnetic field using a high-frequency alternating current supplied by the power supply unit 112, and an insulating sheet for protecting a coil from heat generated by a working coil forming an induced magnetic field. In FIG. 2, the first working coil assembly 122 may include a first working coil 132 for heating a container placed in a first heating zone 12, and a first insulating sheet 130, for example. Additionally, though not illustrated, the second working coil assembly 124 may include a second working coil and a second insulating sheet. Depending on embodiments, the insulating sheet may not be provided.

Figure 4:
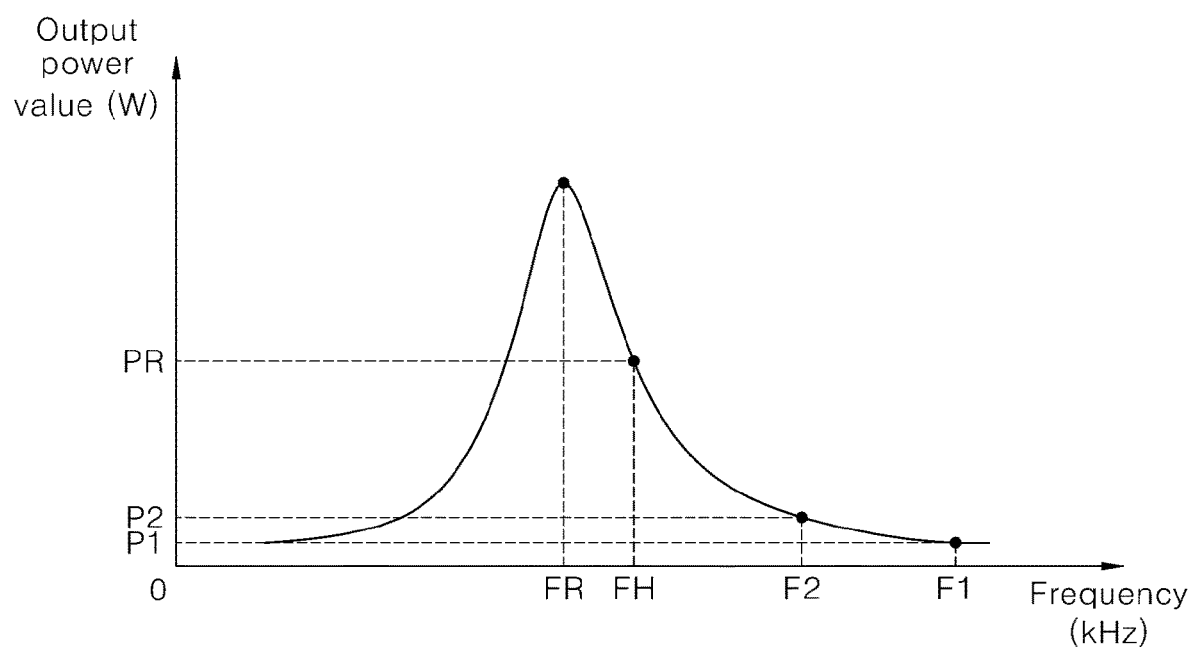
FIG. 4 is a graph showing a relationship between a driving frequency of an inverter circuit and an output power value of a working coil in one embodiment.

Each of the working coils may be provided with a temperature sensor, in a central portion thereof. In FIG. 4, a temperature sensor 134 may be disposed in a central portion of the first working coil 132, for example. The temperature sensor may measure a temperature of a container placed in each of the heating zones. In one embodiment, the temperature sensor may be a thermistor temperature sensor having a variable resistance whose resistance value changes according to the temperature of the container, but the type of the temperature sensor is not limited thereto.

In one embodiment, the temperature sensor may output a sensing voltage corresponding to a temperature of a container, and the sensing voltage output from the temperature sensor may be delivered to the controller. The controller may ascertain the temperature of the container, based on magnitude of the sensing voltage output from the temperature sensor, and when the temperature of the container is a predetermined reference value or greater, may perform an overheat preventing operation by decreasing an actual power value of a working coil or stopping driving of a working coil.

Furthermore, though not illustrated in FIG. 2, a substrate may be disposed in the space formed inside the case 102, and a plurality of circuits or elements including the controller may be mounted onto the substrate. The controller may drive each of the working coils according to the user's instruction to initiate heating, input through the interface 114, to perform a heating operation. When the user inputs an instruction to end heating through the interface 114, the controller may stop the driving of the working coils to end the heating operation.

Figure 3:
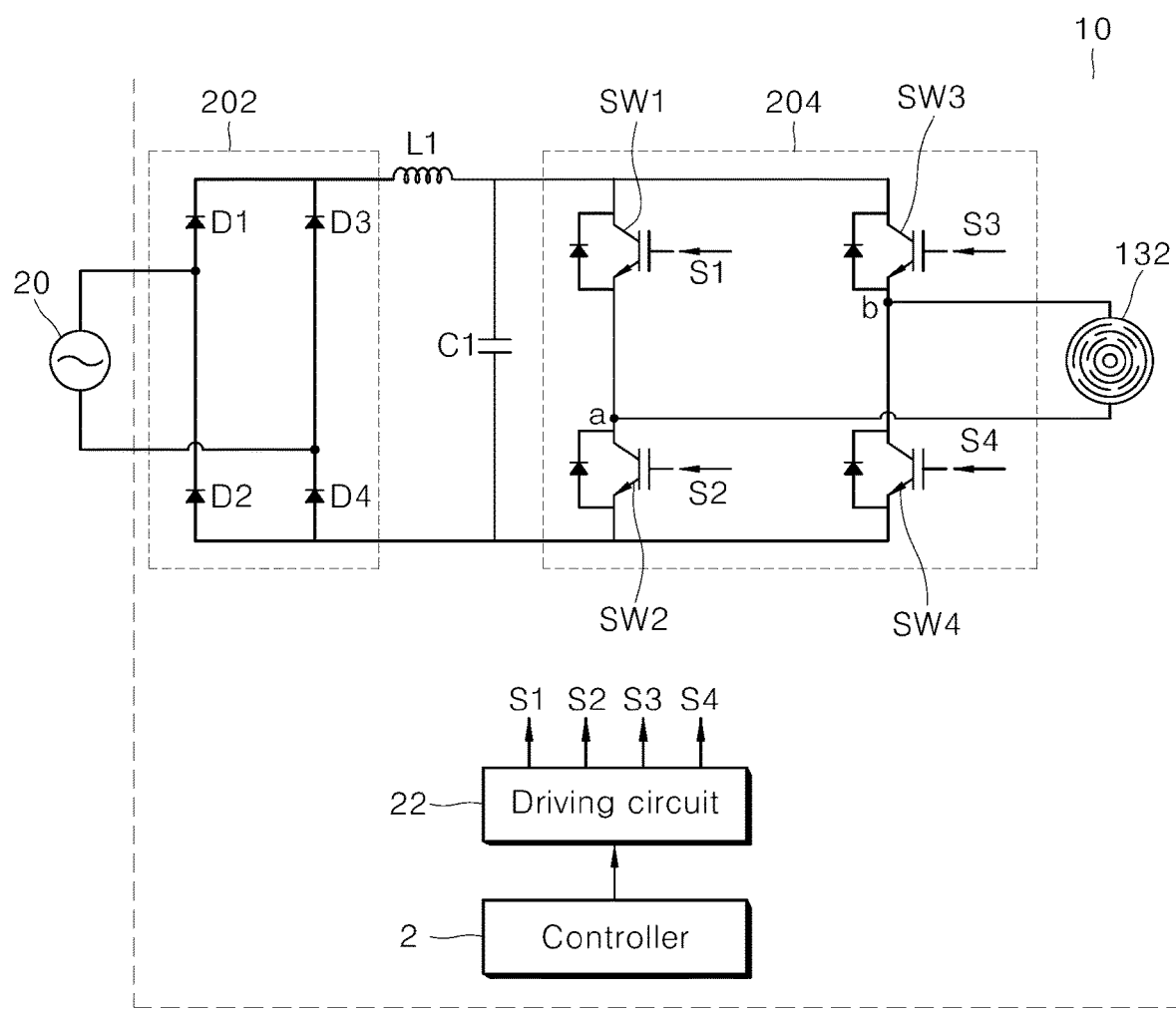
FIG. 3 is a circuit diagram of the induction heating apparatus in one embodiment.

FIG. 3 is a circuit diagram of the induction heating apparatus in one embodiment. The induction heating apparatus 10 in one embodiment may include a rectifying circuit 202, smoothing circuits L1, C1, an inverter circuit 204, a working coil 132, a controller 2, and a driving circuit 22.

The rectifying circuit 202 may include a plurality of diode elements D1, D2, D3, D4. The rectifying circuit 202 may be a bridge diode circuit, as illustrated in FIG. 3, and/or may be another circuit depending on embodiments. The rectifying circuit 202 may rectify AC voltage supplied by a power supply device 20 (or by a power supply) and output voltage having a pulse waveform.

The smoothing circuits L1, C1 may smooth the voltage rectified by the rectifying circuit 202 and output DC link voltage. The smoothing circuits L1, C1 may include a first inductor L1 and a DC link capacitor C1.

The inverter circuit 204 may include a first switching element SW1, a second switching element SW2, a third switching element SW3, and a fourth switching element SW4. Other numbers of switching elements may also be include as part of the inverter circuit 204.

As illustrated in FIG. 3, the inverter circuit 204 of the induction heating apparatus 10 in one embodiment may be implemented as a full-bridge circuit including four switching elements SW1, SW2, SW3, SW4. In another embodiment, the inverter circuit 204 may be implemented as a half-bridge circuit including two switching elements (i.e., a first switching element SW1 and a second switching element SW2 in FIG. 3).

The first switching element SW1, the second switching element SW2, the third switching element SW3 and the fourth switching element SW4 may be respectively turned on and turned off by a first switching signal S1, a second switching signal S2, a third switching signal S3 and a fourth switching signal S4. Each of the switching elements SW1, SW2, SW3, SW4 may be turned on when each of the switching signals S1, S2, S3, S4 is at a high level, and turned off when each of the switching signals S1, S2, S3, S4 is at a low level.

In FIG. 3, each of the switching elements SW1, SW2, SW3, SW4 is an IGBT element, for example. However, each of the switching elements SW1, SW2, SW3, SW4 may be another type of switching element (e.g., a BJT or an FET and the like), depending on embodiments.

Any of the switching elements SW1, SW2, SW3, SW4 may be turned on and turned off complementarily. For example, in any operation mode, the second switching element SW2 may be turned off (turned on) while the first switching element SW1 is turned on (turned off). The switching elements that are turned on and turned off complementarily are referred to as 'complementary' switching elements.

Any of the switching elements SW1, SW2, SW3, SW4 may be turned on and turned off identically. For example, in any operation mode, the first switching element SW1 and the third switching element SW3 may be turned on and turned off with the same timing. The switching elements that are turned on and turned off with the same timing are referred to as switching elements 'belonging to the same group'.

The first switching element SW1 and the third switching element SW3 may be referred to as switching elements belonging to a first group (i.e., a high side), and the second switching element SW2 and the fourth switching element SW4 may be referred to as switching elements belonging to a second group (i.e., a low side).

If the inverter circuit 204 is implemented as a half-bridge circuit (i.e., a circuit only including the first switching element SW1 and the second switching element SW2) in another embodiment, the first switching element SW1 may be a switching element belonging to the first group, and the second switching element SW2 may be a switching element belonging to the second group.

DC link voltage input to the inverter circuit 204 may be converted into alternating current as a result of the turn-on and turn-off operations (i.e., a switching operation) of the switching elements SW1, SW2, SW3, SW4 included in the inverter circuit 204. The alternating current converted by the inverter circuit 204 may be supplied to the working coil 132. As a resonance phenomenon occurs in the working coil 132, eddy current may flow in a container, and the container may be heated.

Each of the first switching element S1, the second switching element S2, the third switching element S3 and the fourth switching element S4 may be a pulse width modulation (PWM) signal having a predetermined duty cycle.

When the alternating current output from the inverter circuit 204 is supplied to the working coil 132, the working coil 132 may be driven. As a result of the driving of the working coil 132, a container placed over (or provided on) the working coil 132 may be heated while eddy current flows in the container. During the driving of the working coil 132, magnitude of thermal energy supplied to the container may vary depending on magnitude of power actually generated as a result of the driving of the working coil (i.e., an actual output power value of the working coil).

When the induction heating apparatus 10 is powered on as a result of manipulation of the interface of the induction heating apparatus 10 by the user, the induction heating apparatus may be put on standby for driving as power is supplied to the induction heating apparatus from the power supply device 20 (or from the power supply). The user may then place a container over a working coil (or on the working coil) of the induction heating apparatus and set a power level for the container, to give the working coil an instruction to initiate heating. When the instruction to initiate heating is given by the user, a power value required of the working coil 132 (i.e., a required power value of the working coil 132) may be determined based on the power level set by the user.

Having received the user's instruction to initiate heating, the controller 2 may determine a frequency (i.e., a heating frequency) corresponding to the required power value of the working coil 132, and supply a control signal corresponding to the determined heating frequency to the driving circuit 22. Accordingly, the switching signals S1, S2, S3, S4 may be output from the driving circuit 22, and as the switching signals S1, S2, S3, S4 are respectively input to the switching elements SW1, SW2, SW3, SW4, the working coil 132 may be driven. As a result of the driving of the working coil 132, the container may be heated while eddy current flows in the container.

In one embodiment, the controller 2 may determine a heating frequency that is a frequency corresponding to a power level of a heating zone set by the user. For example, when the user sets a power level of a heating zone, the controller 2 may gradually decrease a driving frequency of the inverter circuit 204, in a state in which the driving frequency of the inverter circuit 204 is set to a predetermined reference frequency, until an output power value of the working coil 132 matches a required power value corresponding to the power level set by the user. The controller 2 may determine a frequency at a time when the output power value of the working coil 132 matches the required power value as a heating frequency.

The controller 2 may supply a control signal corresponding to the determined heating frequency to the driving circuit 22. The driving circuit 22 may output switching signals S1, S2, S3, S4 that have a duty ratio corresponding to the heating frequency determined by the controller 2, based on the control signal output from the controller 2. As a result of the input of the switching signals S1, S2, S3, S4, alternating current may be supplied to the working coil 132 while the switching elements SW1, SW2, SW3, SW4 are turned on and turned off complementarily.

In one embodiment, the controller 2 may perform a noise suppressing operation for suppressing an initial driving noise before the heating frequency is determined. Embodiments may be described of a process (or operation) in which the controller 2 of the induction heating apparatus 10 performs a noise suppressing operation and a process (or operation) in which a heating frequency of the inverter circuit 204 is determined.

FIG. 4 is a graph showing a relationship between a driving frequency of an inverter circuit and an output power value of a working coil in one embodiment. In FIG. 4, FR denotes a resonance frequency of the inverter circuit 204. In one embodiment, the driving frequency of the inverter circuit 204 may be determined as a value greater than the resonance frequency FR. Additionally, in FIG. 4, PR denotes a required power value corresponding to a power level set for a heating zone, and FH denotes a driving frequency (i.e., a heating frequency) of the inverter circuit 204 when an output power value of the working coil 132 matches the required power value PR.

Before the heating frequency FH is determined as described above, the controller 2 may perform a noise suppressing operation. To perform the noise suppressing operation, the controller 2 may set a driving frequency of the inverter circuit 204 to a predetermined first driving frequency F1. For example, the first driving frequency F1 may be set to 120 kHz. However, the first driving frequency F1 may be set to different values depending on embodiments.

When the driving frequency of the inverter circuit 204 is set to the first driving frequency F1 as illustrated in FIG. 4, an output power value P1 of the working coil 132 may be much lower than the required power value PR. Accordingly, a container may hardly be heated. This means that a peak-to-peak value of current output from the inverter circuit 204 is very low when the driving frequency of the inverter circuit 204 is set to the first driving frequency F1. When the driving frequency of the inverter circuit 204 is set to the first driving frequency F1, noise, caused by the driving of the working coil 132, may be minimized.

In a state in which the driving frequency of the inverter circuit 204 is set to the first driving frequency F1, the controller 2 may supply switching signals S1, S2, S3, S4 to the inverter circuit 204. The controller 2 may then gradually decrease the driving frequency of the inverter circuit 204 by a predetermined unit size (e.g., 1 kHz) until the driving frequency of the inverter circuit 204 reaches to a second driving frequency F2. For example, the second driving frequency F2 may be set to 60 kHz. However, the second driving frequency F2 may be set to different values depending on embodiments.

When the driving frequency of the inverter circuit 204 is set to the second driving frequency F2 as illustrated in FIG. 4, an output power value P2 of the working coil 132 may be much lower than the required power value PR. Accordingly, the container may hardly be heated. This means that a peak-to-peak value of current output from the inverter circuit 204 is very low when the driving frequency of the inverter circuit 204 is set to the second driving frequency F2. Accordingly, although the driving frequency of the inverter circuit 204 decreases to the second driving frequency F2, noise, caused by the driving of the working coil 132, may still be minimized.

As described above, the noise suppressing operation for suppressing an initial driving noise of the working coil 132 may be performed by decreasing the driving frequency of the inverter circuit 204 from the first driving frequency F1 to the second driving frequency F2.

When the driving frequency of the inverter circuit 204 is decreased to the second driving frequency F2, the controller 2 may determine a heating frequency corresponding to the power level that is input by the user to heat the container. For example, the controller 2 may gradually decrease the driving frequency of the inverter circuit 204 by a predetermined unit size (e.g., 1 kHz) while comparing the output power value of the working coil 132 with the required power value PR when the driving frequency of the inverter circuit 204 is set to the second driving frequency F2. The controller 2 may determine a driving frequency at a time when the output power value of the working coil 132 matches the required power value PR as a heating frequency FH.

When the heating frequency FH is determined, the controller 2 may supply a control signal corresponding to the heating frequency FH to the driving circuit 22. Accordingly, the driving circuit 22 may supply switching signals S1, S2, S3, S4 corresponding to the heating frequency FH to the inverter circuit 204, and the working coil 132 may output power having a value the same as the required power value PR to heat the container using current supplied by the inverter circuit 204.

The noise suppressing operation performed by the controller 2 may include the below-described control of a duty cycle of a switching signal as well as the above-described control of a driving frequency of the inverter circuit 204.

Figure 5:
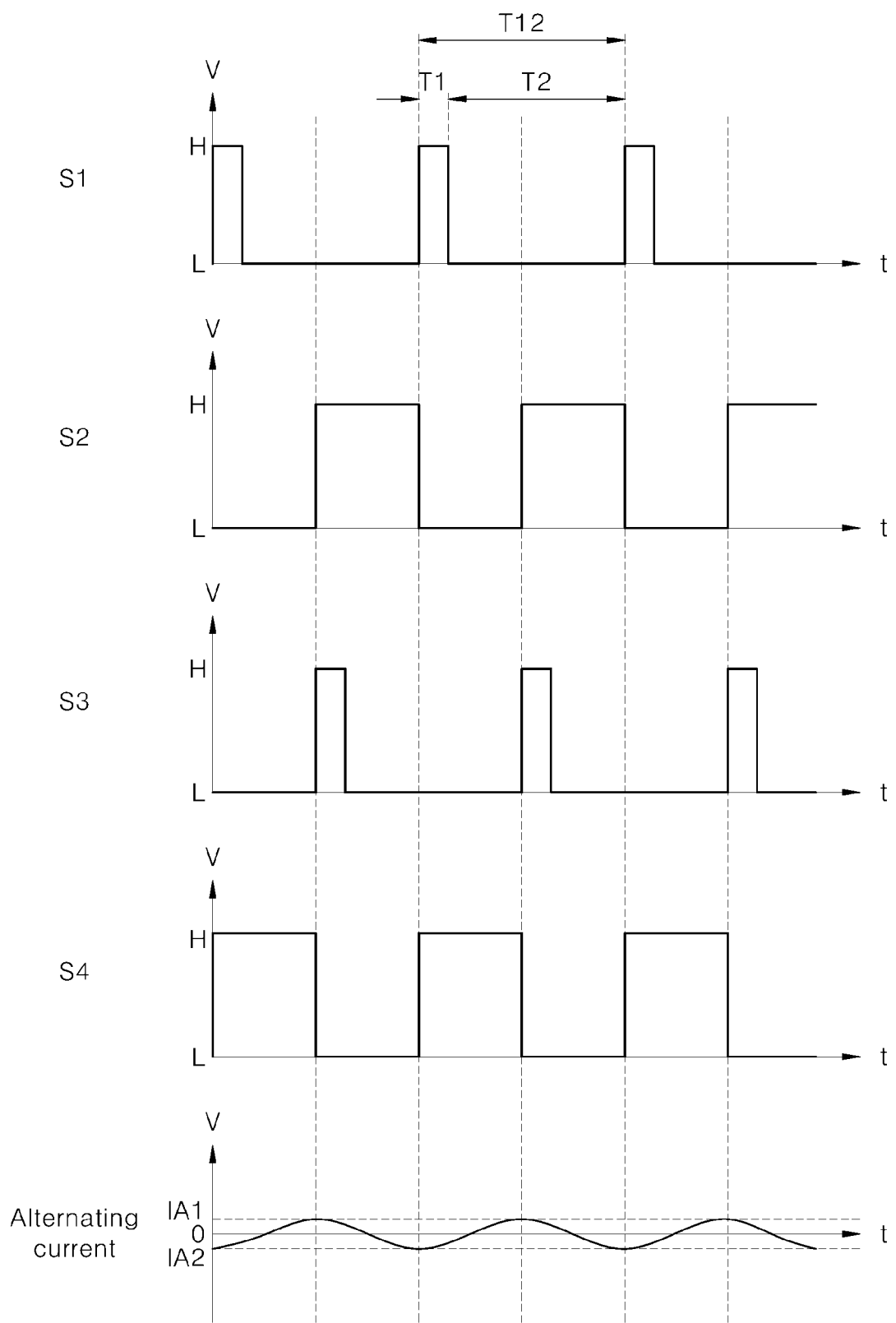
FIG. 5 is a view showing a waveform of each of the switching signals and a waveform of current supplied to the working coil when duty cycles of the switching signals input to switching elements belonging to a first group are set to 0.05, in one embodiment.
Figure 6:
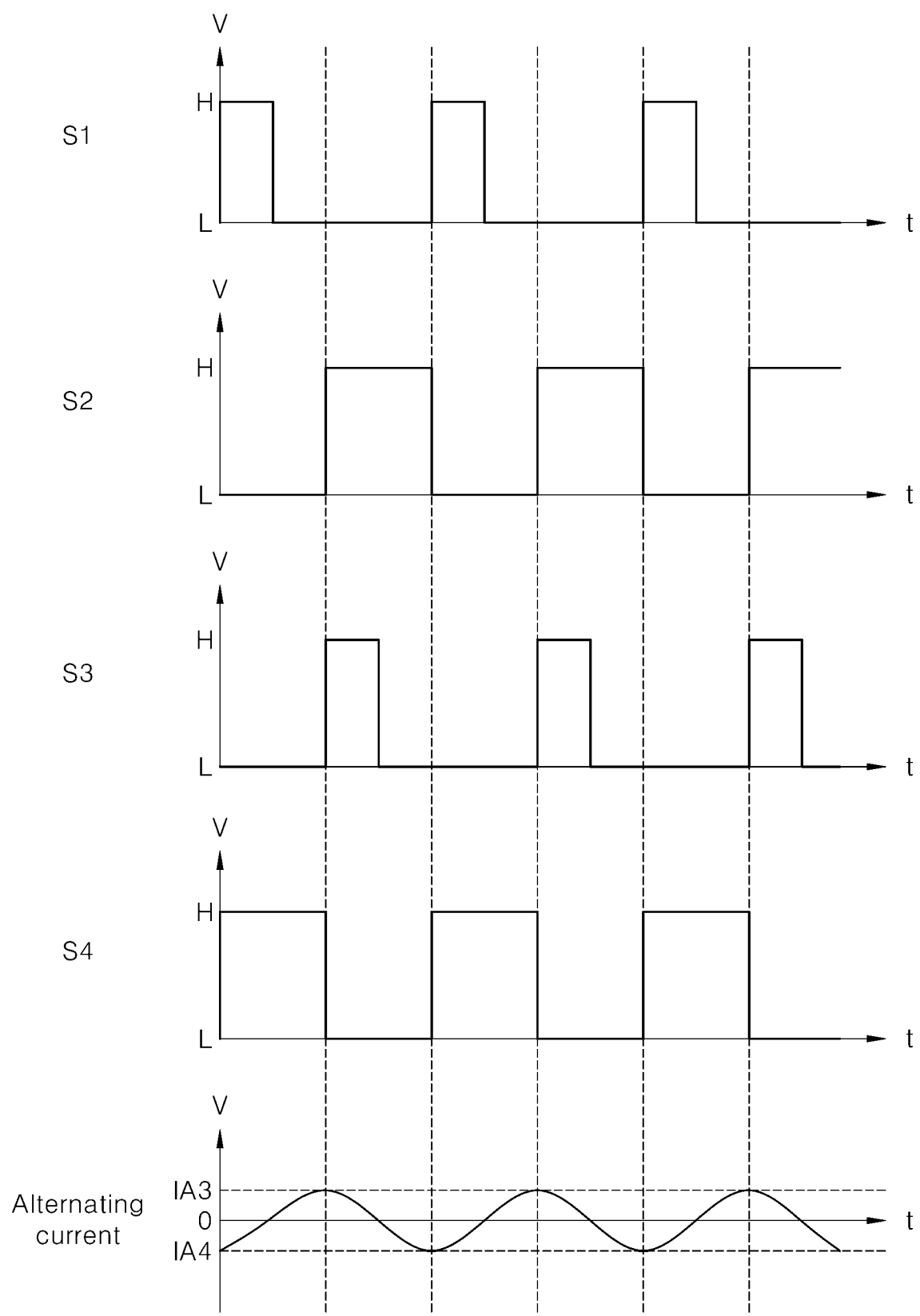
FIG. 6 is a view showing a waveform of each of the switching signals and a waveform of current supplied to the working coil when the duty cycles of the switching signals input to the switching elements belonging to the first group are set to 0.25, in one embodiment.
Figure 7:
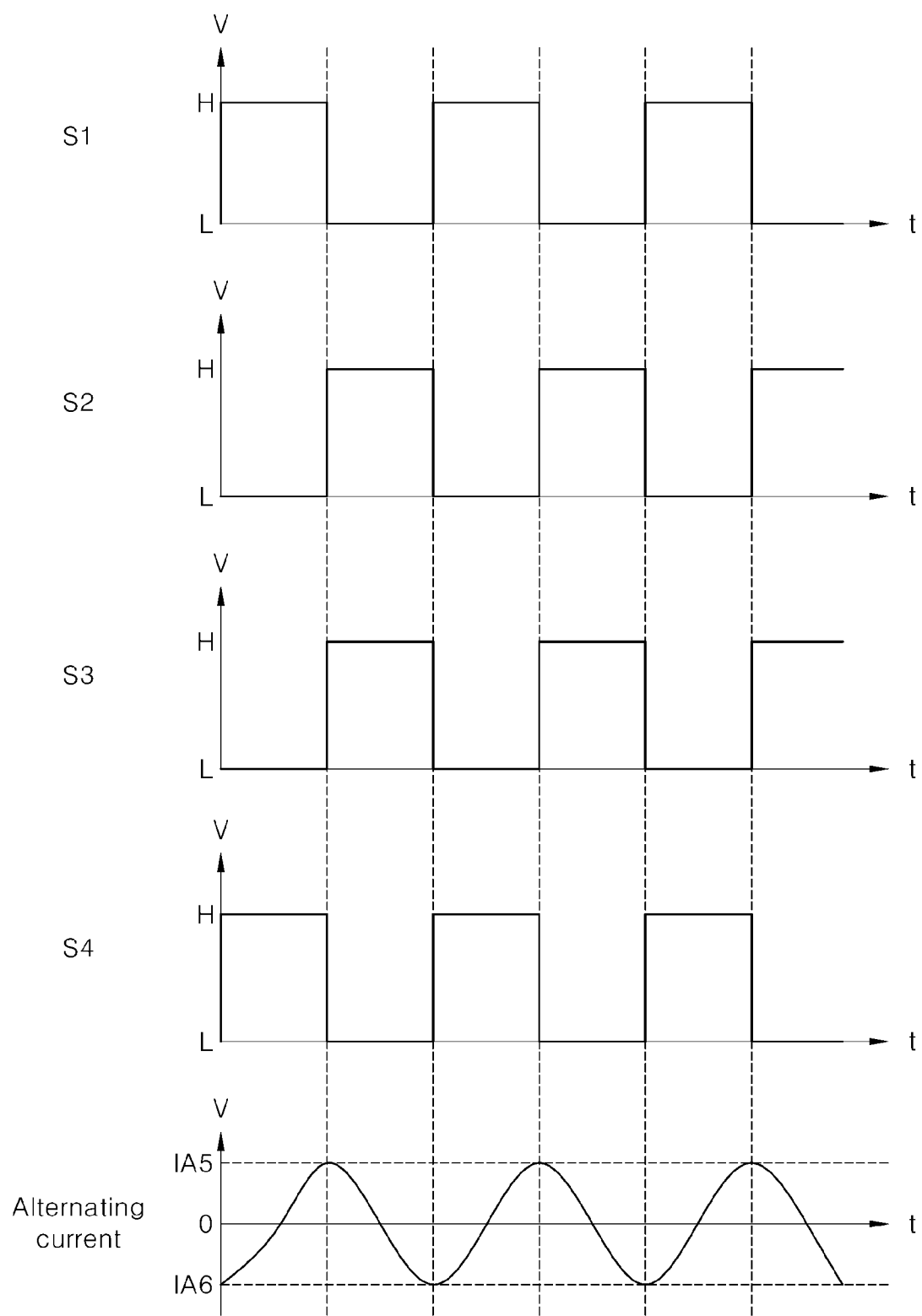
FIG. 7 is a view showing a waveform of each of the switching signals and a waveform of current supplied to the working coil when the duty cycles of the switching signals input to the switching elements belonging to the first group are set to 0.5, in one embodiment.

FIG. 5 is a view showing a waveform of each of the switching signals and a waveform of current supplied to the working coil when duty cycles of the switching signals input to switching elements belonging to a first group are set to 0.05, in one embodiment. FIG. 6 is a view showing a waveform of each of the switching signals and a waveform of current supplied to the working coil when the duty cycles of the switching signals input to the switching elements belonging to the first group are set to 0.25, in one embodiment. FIG. 7 is a view showing a waveform of each of the switching signals and a waveform of current supplied to the working coil when the duty cycles of the switching signals input to the switching elements belonging to the first group are set to 0.5, in one embodiment.

FIGS. 5 to 7 show a waveform of each of the switching signals S1, S2, S3, S4 output by the driving circuit 22. Additionally, FIGS. 5 to 7 show a waveform of current supplied to the working coil 132 when each of the switching signals S1, S2, S3, S4 is supplied to each of the switching elements SW1, SW2, SW3, SW4 of the inverter circuit 204.

Before the heating frequency FH is determined as described above, the controller 2 may perform a noise suppressing operation. To perform the noise suppressing operation, the controller 2 may adjust duty cycles of the switching signals S1, S3 input to some of the switching elements SW1, SW2, SW3, SW4 included in the inverter circuit 204 (e.g., the switching elements SW1 and SW3 belonging to the first group). An embodiment may be described in which the duty cycles of the switching signals S1, S3 input to the switching elements SW1 and SW3 belonging to the first group are adjusted. However, in another embodiment, duty cycles of the switching signals S2, S4 input to the switching elements SW2, SW4 belonging to the second group may be adjusted.

As illustrated in FIG. 5, a duty cycle of a switching signal is defined as a ratio (T1/T12) of on-time T1 to a total of on-time T1 and off-time T2 of the switching signal (i.e., a single cycle time of the switching signal).

When the noise suppressing operation is started, the controller 2 may set duty cycles of the switching signals S1, S3, input to the switching elements SW1 and SW3 belonging to the first group, to a predetermined first reference duty cycle, e.g., 0.05 (see FIG. 5). The controller 2 may then increase the duty cycles of the switching signals S1, S3 input to the switching elements SW1 and SW3 belonging to the first group by a predetermined unit size (e.g., 0.01) until the duty cycles of the switching signals S1, S3 input to the switching elements SW1 and SW3 belonging to the first group increase to a second reference duty cycle (e.g., 0.5). The first reference duty cycle may be set to different values depending on embodiments.

FIG. 6 shows waveforms of the switching signals when the duty cycles of the switching signals S1, S3 input to the switching elements SW1 and SW3 belonging to the first group increase to 0.25. FIG. 7 shows waveforms of the switching signals when the duty cycles of the switching signals S1, S3 input to the switching elements SW1 and SW3 belonging to the first group increase to the second reference duty cycle (e.g. 0.5). The second reference duty cycle may be set to different values depending on embodiments.

In FIGS. 5 to 7, the duty cycles of the switching signals S2, S4 input to the switching elements SW2 and SW4 belonging to the second group may be fixed to the second reference duty cycle (e.g., 0.5). The duty cycles of the switching signals S2, S4 input to the switching elements SW2 and SW4 belonging to the second group may be set to different values depending on embodiments.

As illustrated in FIGS. 5 to 7, a range (a peak-to-peak value) of alternating current supplied to the working coil 132 may gradually increase, as the duty cycles of the switching signals S1, S3 input to the switching elements SW1 and SW3 belonging to the first group gradually increase from the first reference duty cycle (e.g., 0.05) to the second reference duty cycle (e.g., 0.5). For example, in FIGS. 5 to 7, the peak-to-peak value of the alternating current supplied to the working coil 132 may gradually increase to IA1-IA2, IA3-IA4, and IA5-IA6 respectively.

Since the duty cycles of the switching signals S1, S3 input to the switching elements SW1 and SW3 belonging to the first group are adjusted as described above, alternating current having a peak-to-peak value may not be instantaneously supplied to the working coil 132 during an initial driving process of the working coil 132, and the peak-to-peak value of the current supplied to the working coil 132 may gradually increase, unlike that of the related art. Accordingly, during the initial driving process of the working coil 132, the peak-to-peak value of the current supplied to the working coil 132 may be prevented from increasing excessively and instantly, and an initial driving noise may not be made.

Figure 8:
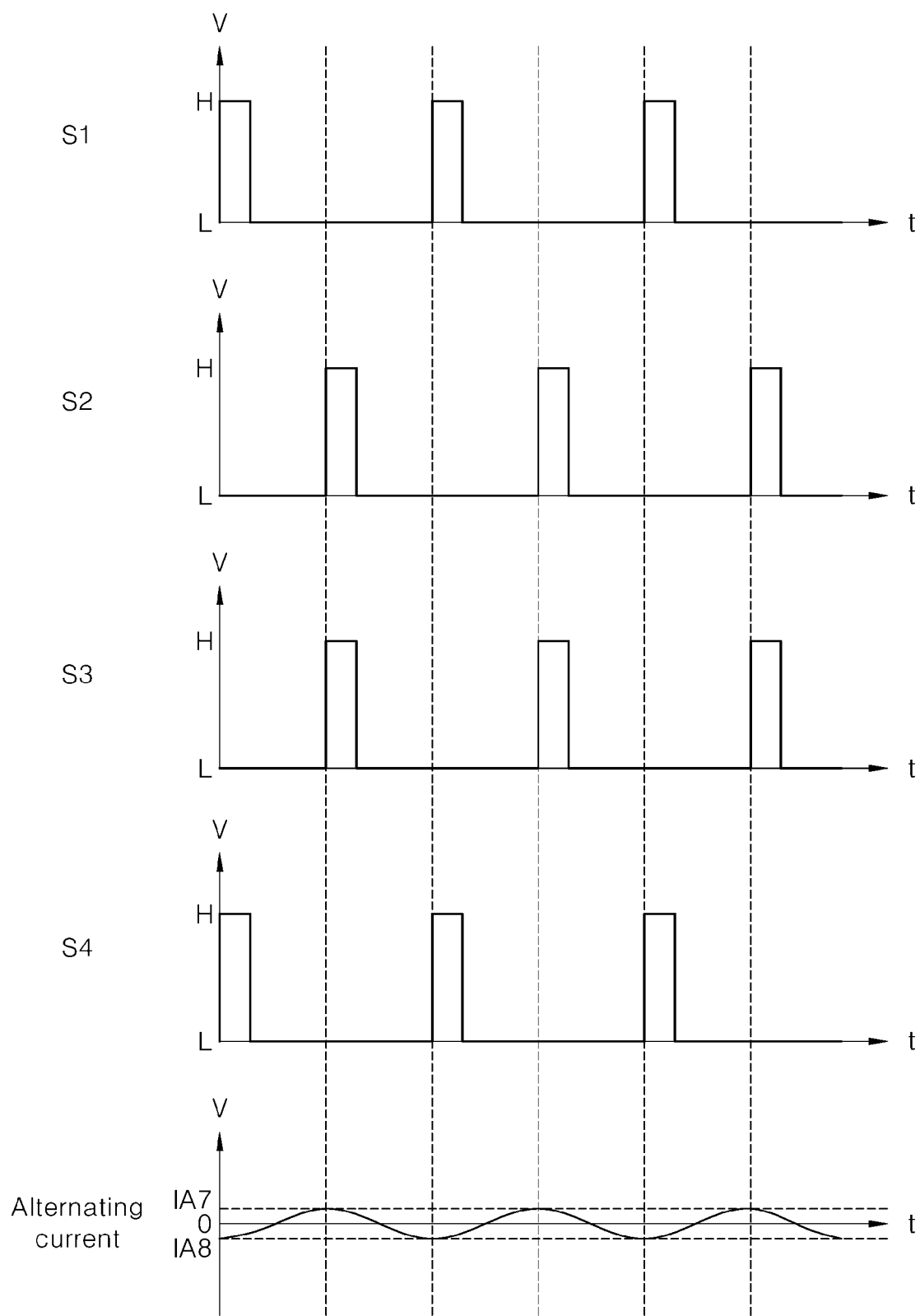
FIG. 8 is a view showing a waveform of each switching signal and a waveform of current supplied to the working coil when the duty cycle of the switching signal input to each switching element is set to 0.05, in one embodiment.
Figure 9:
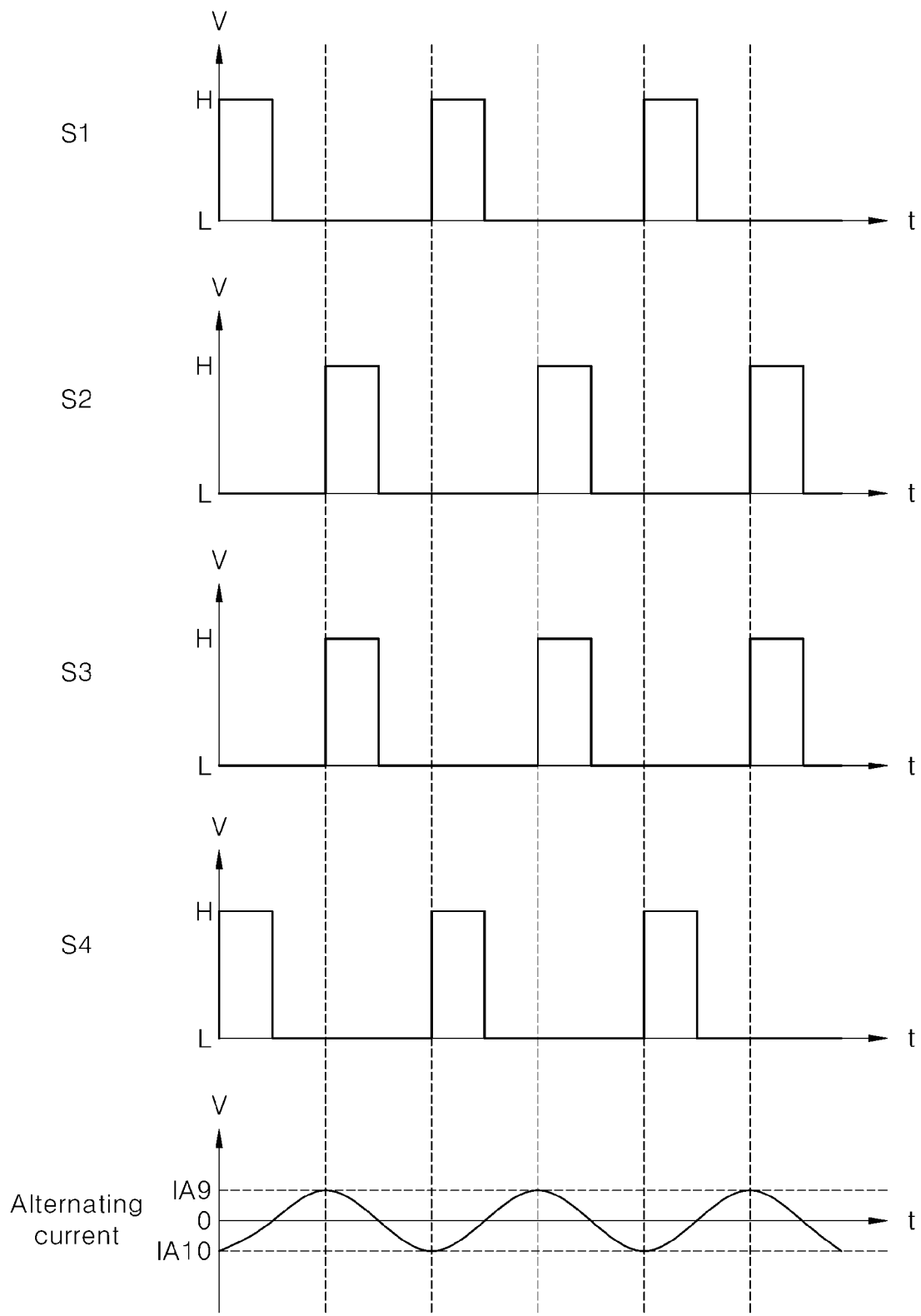
FIG. 9 is a view showing a waveform of each switching signal and a waveform of current supplied to the working coil when the duty cycle of the switching signal input to each switching element is set to 0.25, in one embodiment.
Figure 10:
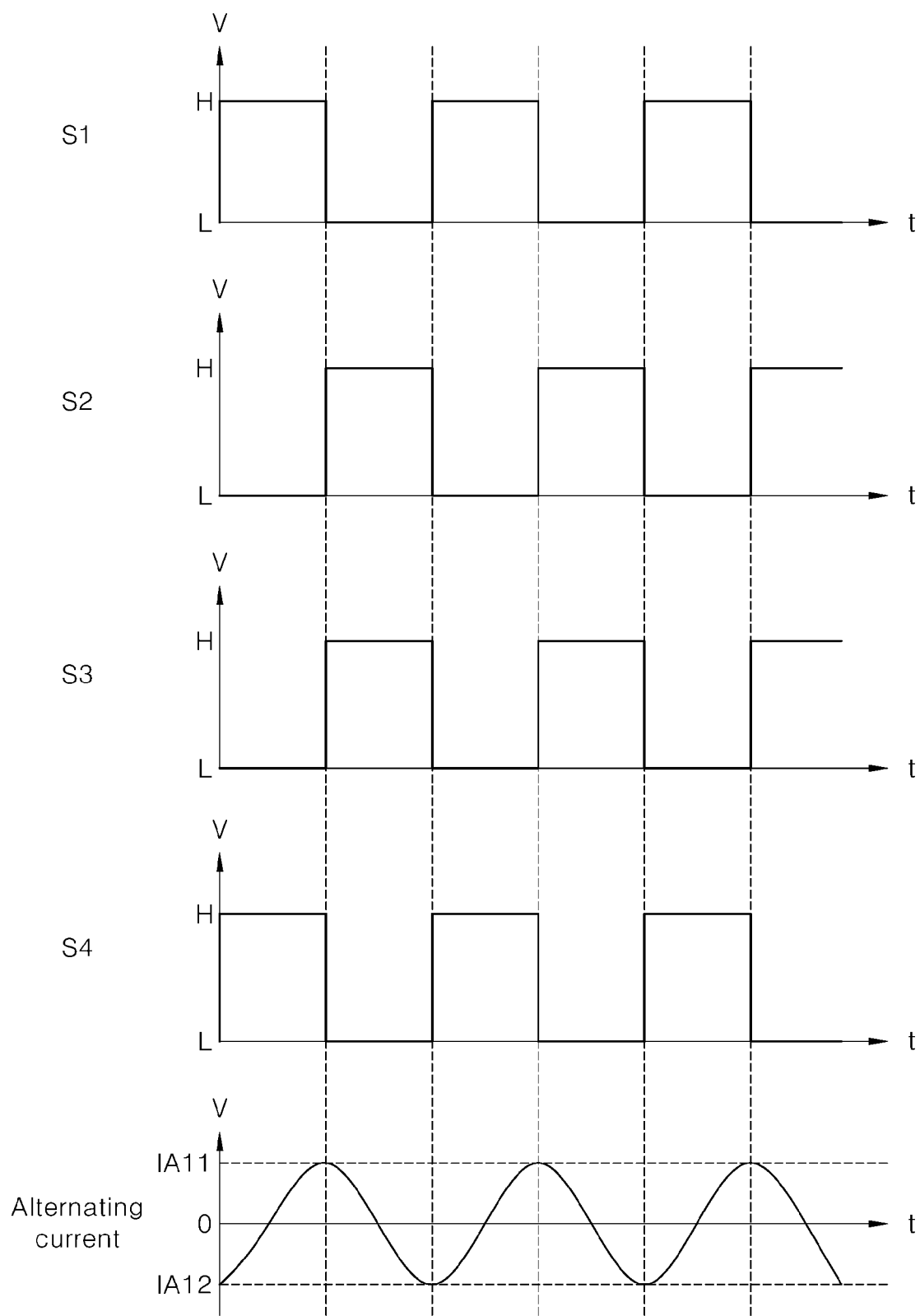
FIG. 10 is a view showing a waveform of each switching signal and a waveform of current supplied to the working coil when the duty cycle of the switching signal input to each switching element is set to 0.5, in one embodiment.

FIG. 8 is a view showing a waveform of each switching signal and a waveform of current supplied to the working coil when the duty cycle of the switching signal input to each switching element is set to 0.05, in one embodiment. FIG. 9 is a view showing a waveform of each switching signal and a waveform of current supplied to the working coil when the duty cycle of the switching signal input to each switching element is set to 0.25, in one embodiment. FIG. 10 is a view showing a waveform of each switching signal and a waveform of current supplied to the working coil when the duty cycle of the switching signal input to each switching element is set to 0.5, in one embodiment.

FIGS. 8 to 10 show a waveform of each of the switching signals S1, S2, S3, S4 output by the driving circuit 22. Additionally, FIGS. 8 to 10 show a waveform of current supplied to the working coil 132 when each of the switching signals S1, S2, S3, S4 is supplied to each of the switching elements SW1, SW2, SW3, SW4 of the inverter circuit 204.

In another embodiment, to perform the noise suppressing operation, the controller 2 may adjust the duty cycle of the switching signal S1, S2, S3, S4 input to each of the switching elements SW1, SW2, SW3, SW4 included in the inverter circuit 204, as illustrated in FIGS. 8 to 10.

When the noise suppressing operation is started, the controller 2 may set the duty cycle of the switching signal S1, S2, S3, S4, input to each of the switching elements SW1, SW2, SW3, SW4, to a predetermined first reference duty cycle, e.g., 0.05 (see FIG. 8). The controller 2 may then increase the duty cycle of the switching signal S1, S2, S3, S4 input to each of the switching elements SW1, SW2, SW3, SW4 by a predetermined unit size (e.g., 0.01) until the duty cycle of the switching signal S1, S2, S3, S4 input to each of the switching elements SW1, SW2, SW3, SW4 increases to a second reference duty cycle (e.g., 0.5). The first reference duty cycle may be set to different values depending on embodiments.

FIG. 9 shows waveforms of the switching signals when the duty cycle of the switching signal S1, S2, S3, S4 input to each of the switching elements SW1, SW2, SW3, SW4 increases to 0.25. FIG. 10 shows waveforms of the switching signals when the duty cycle of the switching signal S1, S2, S3, S4 input to each of the switching elements SW1, SW2, SW3, SW4 increases to the second reference duty cycle (e.g., 0.5).

As illustrated in FIGS. 8 to 10, a range (a peak-to-peak value) of alternating current supplied to the working coil 132 may gradually increase as the duty cycle of the switching signal S1, S2, S3, S4 input to each of the switching elements SW1, SW2, SW3, SW4 gradually increases from the first reference duty cycle (e.g., 0.05) to the second reference duty cycle (e.g., 0.5). For example, in FIGS. 8 to 10, the peak-to-peak value of the alternating current supplied to the working coil 132 may gradually increase to IA7-IA8, IA9-IA10 and IA11-IA12 respectively.

Since the duty cycle of the switching signal S1, S2, S3, S4 input to each of the switching elements SW1, SW2, SW3, SW4 is adjusted as described above, alternating current having a peak-to-peak value may not be instantaneously supplied to the working coil 132 during an initial driving process of the working coil 132, and the peak-to-peak value of the current supplied to the working coil 132 may gradually increase, unlike that of the related art. Accordingly, during the initial driving process of the working coil 132, the peak-to-peak value of the current supplied to the working coil 132 may be prevented from increasing excessively and instantly, and an initial driving noise may not be made.

Figure 11:
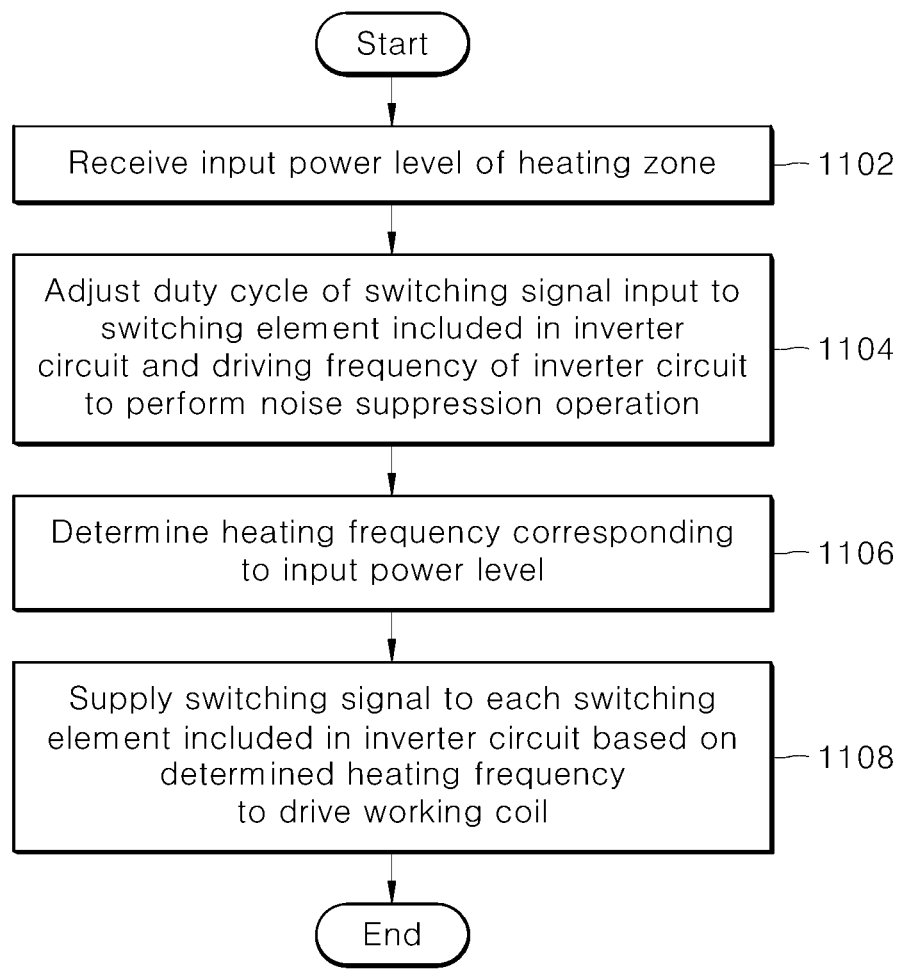
FIG. 11 is a flow chart showing a method for controlling an induction heating apparatus in one embodiment.

FIG. 11 is a flow chart showing a method for controlling an induction heating apparatus in one embodiment. The controller 2 of the induction heating apparatus 10 in one embodiment may receive an input power level of a heating zone formed on an upper plate of the induction heating apparatus 10 (1102). When the power level of the heating zone is input, a required power value of a working coil corresponding to the heating zone may be determined.

The controller 2 may then adjust a duty cycle of a switching signal input to a switching element included in the inverter circuit 204 and a driving frequency of the inverter circuit 204, and perform a noise suppressing operation (1104).

In one embodiment, the noise suppressing operation performed by the controller 2 may include setting duty cycles of switching signals, input to switching elements belonging to a first group, to a predetermined first reference duty cycle, setting a driving frequency of the inverter circuit 204 to a predetermined first reference frequency, supplying a switching signal to each of the switching elements included in the inverter circuit 204, based on the first reference duty cycle and the first reference frequency, increasing the duty cycles of the switching signals, supplied to the switching elements belonging to the first group, to a predetermined second reference duty cycle, and decreasing the driving frequency of the inverter circuit 204 to a predetermined second reference frequency.

In one embodiment, during the noise suppressing operation, duty cycles of switching signals input to switching elements belonging to a second group may be set to a predetermined third reference duty cycle.

In one embodiment, the third reference duty cycle may be set to a duty cycle the same as the second reference duty cycle.

In another embodiment, the noise suppressing operation performed by the controller 2 may include setting a duty cycle of a switching signal, input to each of the switching elements included in the inverter circuit 204, to a predetermined first reference duty cycle, setting a driving frequency of the inverter circuit 204 to a predetermined first reference frequency, supplying a switching signal to each of the switching elements included in the inverter circuit 204, based on the first reference duty cycle and the first reference frequency, increasing a duty cycle of a switching signal supplied to each of the switching elements included in the inverter circuit 204 to a predetermined second reference duty cycle, and decreasing the driving frequency of the inverter circuit 204 to a predetermined second reference frequency.

When completing the noise suppressing operation, the controller 2 may determine a heating frequency corresponding to the power level that was previously input (1106). The determining of a heating frequency corresponding to the power level (1106) may include comparing an output power value of the working coil 132 with the required power value while decreasing the driving frequency of the inverter circuit 204, and determining a driving frequency at a time when the output power value matches the required power value as the heating frequency.

When the heating frequency is determined, the controller 2 may drive the working coil 132 by supplying a switching signal to each switching element included in the inverter circuit 204, based on the determined heating frequency (1108).

Figure 12:
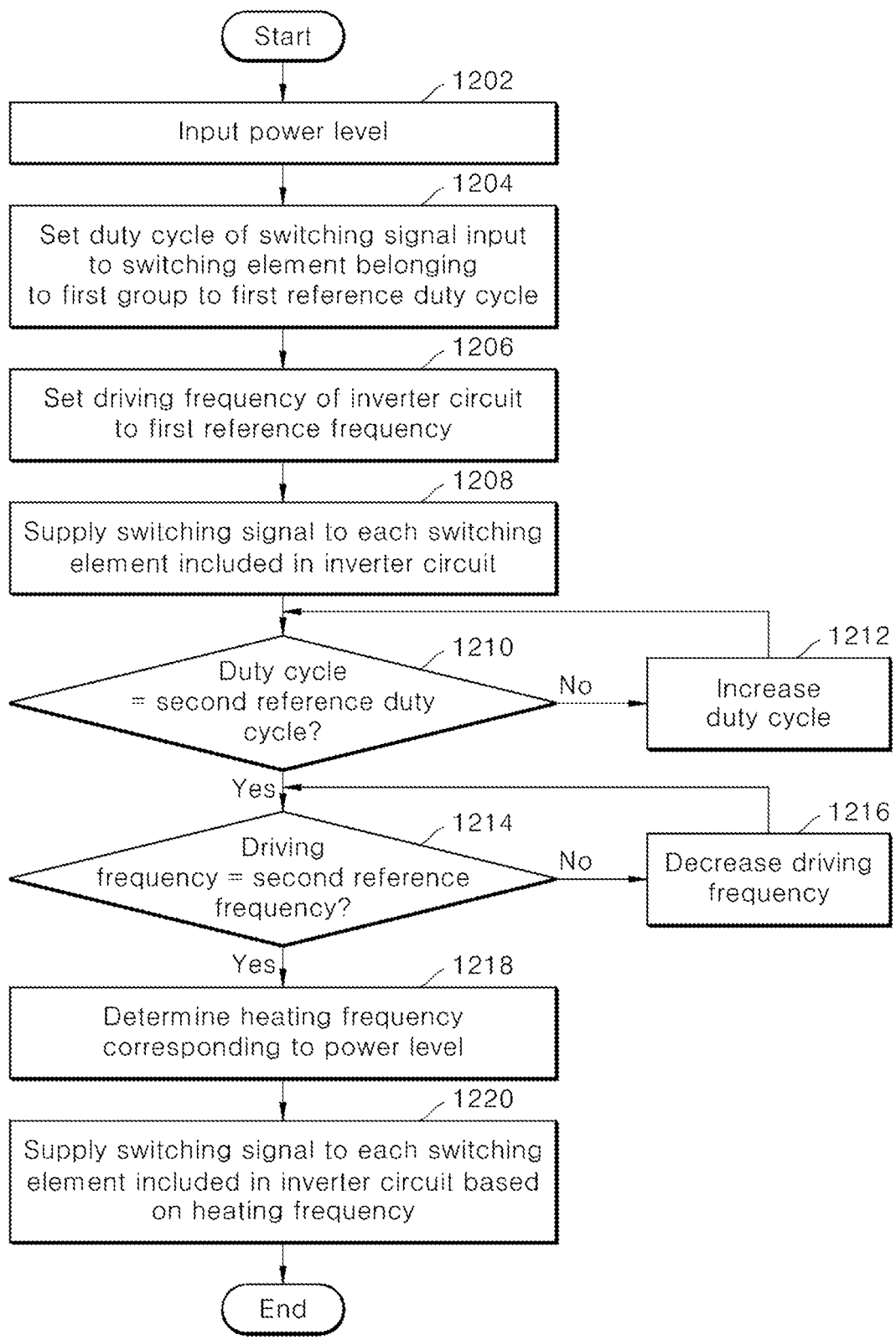
FIG. 12 is a flow chart showing a method for controlling an induction heating apparatus in another embodiment.

FIG. 12 is a flow chart showing a method for controlling an induction heating apparatus in another embodiment. To heat a container placed in (or provided on) a heating zone, the user may input a power level of the heating zone, in which the container to be heated is placed, through a manipulation zone 118 of the induction heating apparatus 10. Accordingly, the controller 2 may receive the input power level of the heating zone (1202). When the power level of the heating zone is input, the controller 2 may calculate an output power value corresponding to the input power level, and determine the calculated output power value as a required power value of a working coil 132 corresponding to the heating zone.

After the power level is input, the controller 2 may perform a noise suppressing operation including steps 1204 to 1214, to suppress initial driving noise that is generated before the working coil 132 starts to heat the container.

When the noise suppressing operation is started, the controller 12 may set duty cycles of switching signals input to switching elements belonging to a first group to a first reference duty cycle (1204). For example, the controller 2 may set the duty cycles of the switching signals S1, S3, input to the switching elements SW1, SW3 belonging to the first group, to a predetermined first reference duty cycle (e.g., 0.05), in the circuit illustrated in FIG. 3.

Additionally, the controller 2 may set a driving frequency of the inverter circuit 204 to a predetermined first reference frequency (1206). For example, the controller 2 may set the driving frequency of the inverter circuit 204 to the predetermined first reference frequency (e.g., 120 kHz), in the circuit illustrated in FIG. 3.

The controller 2 may supply a switching signal to each of the switching elements included in the inverter circuit, based on the first reference duty cycle set in operation 1204 and the first reference frequency set in operation 1206 (1208). Accordingly, alternating current generated from the inverter circuit may be supplied to the working coil.

The controller 2 may then determine whether the duty cycles of the switching signals input to the switching elements belonging to the first group are the same as a predetermined second reference duty cycle (e.g., 0.5) (1210).

When the duty cycles of the switching signals input to the switching elements belonging to the first group are not the same as the second reference duty cycle in operation 1210, the controller 2 may increase the duty cycles of the switching signals input to the switching elements belonging to the first group by a predetermined unit size (e.g., 0.01) (1212). As a result of repetition of operation 1210 and operation 1212, the duty cycles of the switching signals input to the switching elements belonging to the first group may gradually increase from the first reference duty cycle to the second reference duty cycle.

FIG. 12 shows an embodiment in which the duty cycles of the switching signals input to the switching elements belonging to the first group gradually increase from the first reference duty cycle to the second reference duty cycle. In another embodiment, duty cycles of switching signals input to all the switching elements included in the inverter circuit 204 may gradually increase from the first reference duty cycle to the second reference duty cycle.

When the duty cycles of the switching signals input to the switching elements belonging to the first group are the same as the second reference duty cycle in operation 1210, the controller 2 may determine whether the driving frequency of the inverter circuit is the same as a predetermined second reference frequency (e.g., 60 kHz) (1214).

When the duty cycles of the switching signals input to the switching elements belonging to the first group are not the same as the second reference duty cycle in operation 1214, the controller 2 may decrease the driving frequency of the inverter circuit by a predetermined unit size (e.g., 1 kHz) (1216). As a result of repetition of operation 1214 and operation 1216, the driving frequency of the inverter circuit may gradually decrease from the first reference frequency to the second reference frequency.

When the duty cycles of the switching signals input to the switching elements belonging to the first group are the same as the second reference duty cycle in operation 1214, the noise suppressing operation may end.

When the noise suppressing operation is completed, the controller 2 may determine a heating frequency corresponding to the power level which was input in operation 1202 (1218). For example, the controller 2 may compare the output power value of the working coil 132 with the required power value while decreasing the driving frequency of the inverter circuit 204 by a predetermined unit size (e.g., 1 kHz) from the second reference frequency (e.g., 60 kHz). The controller 2 may determine a driving frequency at a time when the output power value of the working coil 132 matches the required power value as a frequency for heating the container (i.e., a heating frequency).

When the heating frequency is determined, the controller 2 may supply a switching signal to each of the switching elements included in the inverter circuit, based on the heating frequency (1220). In operation 1220, a duty cycle of a switching signal S1, S2, S3, S4 supplied to each of the switching elements may be set to the same duty cycle. Accordingly, while alternating current output from the inverter circuit is supplied to the working coil 132, the working coil 132 may output power having the same value as the required power value, and the container may be heated.

In the embodiment of FIG. 12, when the noise suppressing operation is performed, the driving frequency of the inverter circuit may be adjusted after the duty cycles of the switching signals input to the inverter circuit is adjusted. However, in another embodiment, the duty cycles of the switching signals may be adjusted after the driving frequency of the inverter circuit is adjusted. In yet another embodiment, the duty cycles of the switching signals and the driving frequency of the inverter circuit may be adjusted at the same time.

It is an object of the present disclosure to provide an induction heating apparatus and a method for controlling the same that reduces initial driving noise generated at a time when a power level of a heating zone is set and a container starts to be heated.

The object may be solved by features of the independent claims. Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

In one embodiment, when a power level of a heating zone is input, a noise suppressing operation may be performed to suppress initial driving noise that can be generated before a frequency for heating a container (i.e., a heating frequency) is determined.

A controller of an induction heating apparatus in one embodiment may perform the noise suppressing operation by adjusting duty cycles of switching signals input to switching elements included in an inverter circuit and a driving frequency of the inverter circuit respectively.

In one embodiment, the controller may gradually increase duty cycles of switching signals input to switching elements belonging to a first group (e.g., a high side), among the switching elements included in the inverter circuit, from a predetermined first reference duty cycle to a predetermined second reference duty cycle. In another embodiment, the controller may gradually increase a duty cycle of a switching signal input to each of the switching elements included in the inverter circuit.

Additionally, in one embodiment, the controller may gradually decrease a driving frequency of the inverter circuit from a predetermined first reference frequency to a predetermined second reference frequency.

As a result of the control over the duty cycles and the driving frequency, magnitude of alternating current supplied to a working coil may gradually increase until an output power value of the working coil becomes identical with a required power value. Accordingly, a temporary increase in the magnitude of the alternating current supplied to the working coil, which would otherwise occur in the related art, may be prevented. Thus, the initial driving noise generated by a working coil in the related art may be suppressed.

According to one aspect, the induction heating apparatus may include a working coil disposed in a position corresponding to a position of a heating zone, an inverter circuit including a plurality of switching elements and configured to supply current to the working coil, a driving circuit configured to supply a switching signal to each of the switching elements included in the inverter circuit, and a controller configured to determine a driving frequency of the inverter circuit, supply a control signal based on the driving frequency to the driving circuit, and drive the working coil. The controller may be configured to perform a control method according to any one of the herein described embodiments.

The controller may be configured to receive an input power level of the heating zone, to adjust duty cycles of switching signals input to the switching elements included in the inverter circuit and a driving frequency of the inverter circuit and to perform a noise suppressing operation, to determine a heating frequency corresponding to the power level, and based on the heating frequency, to supply a switching signal to each of the switching elements included in the inverter circuit and drive the working coil. The controller may be additionally or alternatively configured for setting duty cycles of switching signals, input to switching elements belonging to a first group, to a predetermined first reference duty cycle, setting a driving frequency of the inverter circuit to a predetermined first reference frequency, supplying a switching signal to each of the switching elements included in the inverter circuit, based on the first reference duty cycle and the first reference frequency, increasing the duty cycles of the switching signals, supplied to the switching elements belonging to the first group, to a predetermined second reference duty cycle, and decreasing the driving frequency of the inverter circuit to a predetermined second reference frequency.

The noise suppressing operation may include setting duty cycles of switching signals, input to switching elements belonging to a first group, to a predetermined first reference duty cycle, setting a driving frequency of the inverter circuit to a predetermined first reference frequency, supplying a switching signal to each of the switching elements included in the inverter circuit, based on the first reference duty cycle and the first reference frequency, increasing the duty cycles of the switching signals, supplied to the switching elements belonging to the first group, to a predetermined second reference duty cycle, and decreasing the driving frequency of the inverter circuit to a predetermined second reference frequency.

In one embodiment, during the noise suppressing operation, duty cycles of switching signals input to switching elements belonging to a second group may be set to a predetermined third reference duty cycle.

In one embodiment, the third reference duty cycle may be set to a duty cycle the same as the second reference duty cycle.

In one embodiment, the noise suppressing operation may include setting a duty cycle of a switching signal, input to each of the switching elements included in the inverter circuit, to a predetermined first reference duty cycle, setting a driving frequency of the inverter circuit to a predetermined first reference frequency, supplying a switching signal to each of the switching elements included in the inverter circuit, based on the first reference duty cycle and the first reference frequency, increasing a duty cycle of a switching signal supplied to each of the switching elements included in the inverter circuit to a predetermined second reference duty cycle, and decreasing the driving frequency of the inverter circuit to a predetermined second reference frequency.

In one embodiment, the controller may compare an output power value of the working coil with a required power value while decreasing the driving frequency of the inverter circuit, and determine a driving frequency at a time when the output power value matches the required power value as the heating frequency. The required power value may correspond to the input power level.

According to a further aspect, a method for controlling an induction heating apparatus, in particular for an induction heating apparatus according to any one of the herein described embodiments, may include receiving an input power level of a heating zone, performing a noise suppressing operation by adjusting duty cycles of switching signals input to switching elements included in an inverter circuit and a driving frequency of the inverter circuit, determining a heating frequency corresponding to the power level, and driving a working coil by supplying a switching signal to each switching element included in the inverter circuit, based on the heating frequency.

Performing the noise suppressing operation may include setting duty cycles of switching signals, input to switching elements belonging to a first group, to a predetermined first reference duty cycle, setting a driving frequency of the inverter circuit to a predetermined first reference frequency, supplying a switching signal to each of the switching elements included in the inverter circuit, based on the first reference duty cycle and the first reference frequency, increasing the duty cycles of the switching signals, supplied to the switching elements belonging to the first group, to a predetermined second reference duty cycle, and decreasing the driving frequency of the inverter circuit to a predetermined second reference frequency.

During the noise suppressing operation, duty cycles of switching signals input to switching elements belonging to a second group may be set to a predetermined third reference duty cycle.

The third reference duty cycle may be set to a duty cycle the same as the second reference duty cycle.

Performing the noise suppressing operation may include setting a duty cycle of a switching signal, input to each of the switching elements included in the inverter circuit, to a predetermined first reference duty cycle, setting a driving frequency of the inverter circuit to a predetermined first reference frequency, supplying a switching signal to each of the switching elements included in the inverter circuit, based on the first reference duty cycle and the first reference frequency, increasing a duty cycle of a switching signal supplied to each of the switching elements included in the inverter circuit to a predetermined second reference duty cycle, and decreasing the driving frequency of the inverter circuit to a predetermined second reference frequency.

Determining a heating frequency corresponding to the power level may include comparing an output power value of the working coil with a required power value while decreasing the driving frequency of the inverter circuit, and determining a driving frequency at a time when the output power value matches the required power value as the heating frequency. The required power value may correspond to the input power level.

In the embodiments of the present disclosure, when a power level of a heating zone is set and a container starts to be heated, initial driving noise may be reduced. Thus, a user may experience no inconvenience caused by noise while using an induction heating apparatus and user satisfaction may improve. Additionally, the possibility that the user misunderstood that the induction heating device is malfunctioning due to the initial driving noise is lowered.

Figure 13:
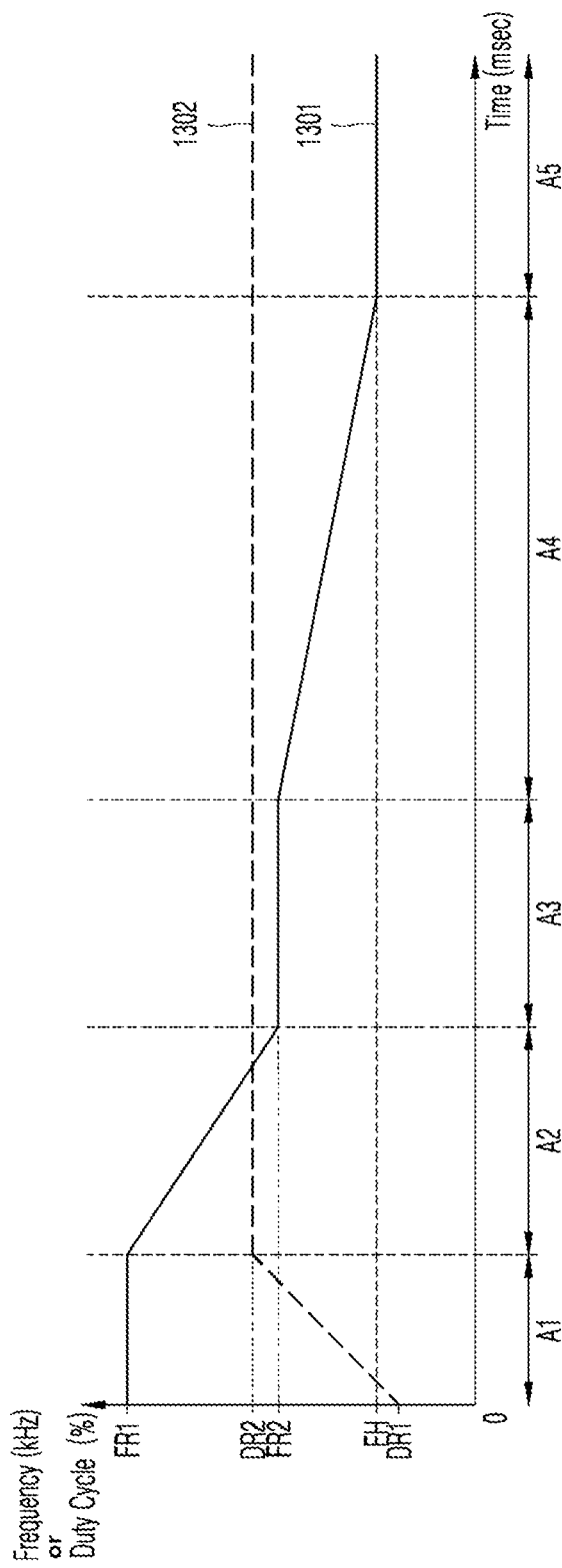
FIG. 13 is a graph showing changes in a driving frequency of an inverter circuit and a duty cycle of a switching signal when the working coil is driven at a high power level in one embodiment.

FIG. 13 is a graph showing changes in a driving frequency of an inverter circuit and a duty cycle of a switching signal when the working coil is driven at a high power level in one embodiment.

In FIG. 13, data 1301 indicates a driving frequency of the inverter circuit, and data 1302 indicates a duty cycle of a switching signal input to the switching elements of the inverter circuit.

In one embodiment, the working coil may be driven at a high power level (e.g., a power level of 4 or more among power levels of 1 to 9). When the user sets the power level of the working coil to a high power level, the working coil is continuously driven until heating is finished.

In FIG. 13, a first section A1 is a section in which the driving of the working coil is started according to an instruction to initiate heating input by the user. In the first section A1, the driving frequency of the inverter circuit is set to a predetermined first reference frequency FR1 (e.g., 120 kHz). In addition, the duty cycle of the switching signal input to the inverter circuit in the first section A1 increases from a predetermined first reference duty cycle DR1 (e.g., 10%) to a second reference duty cycle DR2 (e.g., 50%). That is, the noise suppressing operation is performed in the first section A1 to suppress noise generated during the initial driving of the working coil.

After the noise suppressing operation is completed, in the second section A2, the driving frequency of the inverter circuit decreases from the first reference frequency FR1 to a predetermined second reference frequency FR2 (e.g., 80 kHz).

In the third section A3, the controller 2 determines the heating frequency FH corresponding to the power level input by the user. Also, in the third section A3, the controller 2 may perform a container detection operation for determining whether a heatable container exists above the working coil based on the resonance current value of the working coil.

In the fourth section A4, the driving frequency of the inverter circuit decreases from the second reference frequency FR2 to the heating frequency FH (e.g., 40 kHz). Accordingly, the output power value of the working coil gradually increases.

In the fifth section A5, the inverter circuit is driven at the heating frequency FH. Accordingly, the container is heated to correspond to the power level set by the user.

Meanwhile, the duty cycle of the switching signal input to the inverter circuit in the second section A2 to the fifth section A5 is maintained as the second reference duty cycle DR2.

According to the embodiment shown in FIG. 13, noise generated during the initial driving of the working coil is reduced compared to the related art by the noise suppressing operation performed in the first section A1. In addition, since the driving frequency of the inverter circuit is gradually adjusted to the heating frequency FH from the first reference frequency FR1 and the second reference frequency FR2, noise due to a sudden change in the driving frequency does not occur.

Figure 14:
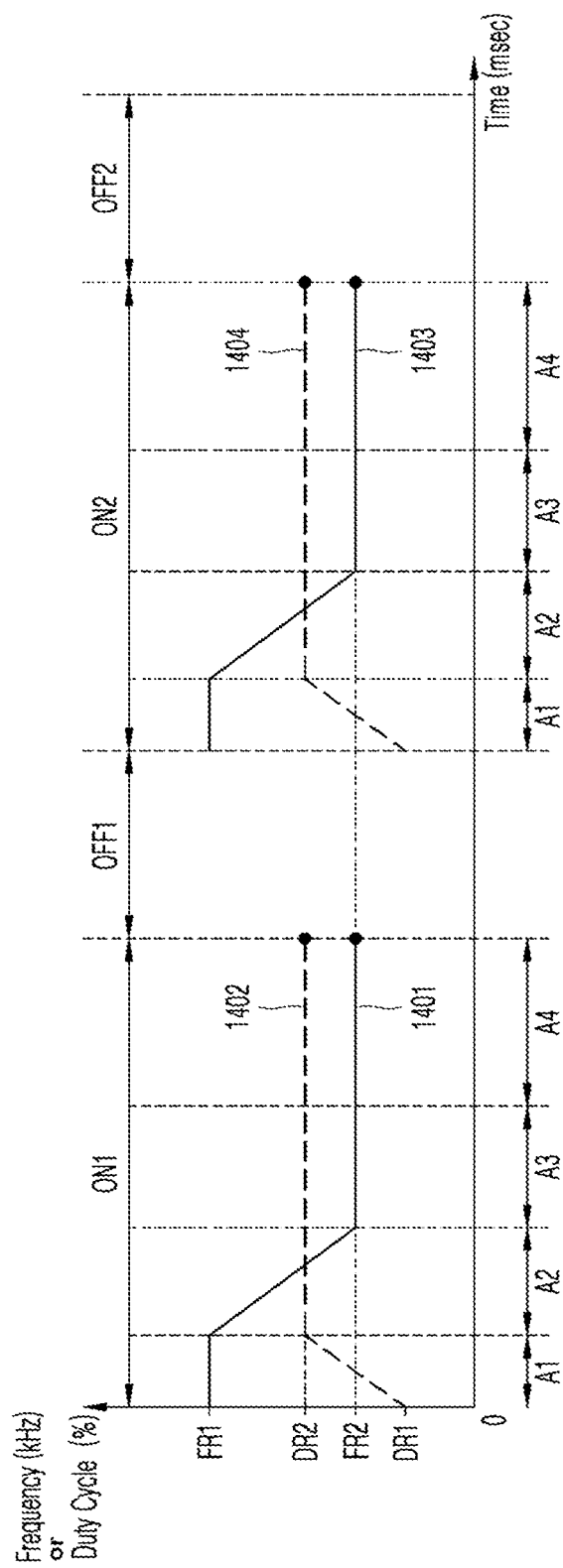
FIG. 14 is a graph showing changes in a driving frequency of an inverter circuit and a duty cycle of a switching signal when the working coil is driven at a low power level in one embodiment.

FIG. 14 is a graph showing changes in a driving frequency of an inverter circuit and a duty cycle of a switching signal when the working coil is driven at a low power level in one embodiment.

In FIG. 14, data 1401 and 1403 indicate driving frequencies of the inverter circuit, and data 1402 and 1404 indicate duty cycles of switching signals input to the switching elements of the inverter circuit.

In one embodiment, the working coil may be driven at a low power level (e.g., a power level of 3 or less among power levels of 1 to 9). When the user sets the power level of the working coil to a low power level, the working coil is discontinuously driven until heating is finished, that is, in an on/off manner.

For example, as shown in FIG. 14, when the working coil is driven at a low power level, the driving of the working coil is controlled so that the on sections (ON1, ON2) in which the working coil is driven and the off sections (OFF1, OFF2) in which the working coil is not driven appear alternately. The controller 2 may control the driving of the working coil so that the average value of the output power values of the working coils accumulated in each of the on sections ON1 and ON2 respectively correspond to the required power value.

It is noted that the power level values belonging to the high power level and the power level values belonging to the low power level may vary according to embodiments.

In FIG. 14, the first on section ON1 includes the first section A1 to the fourth section A4.

The first section A1 is a section in which the driving of the working coil is started according to an instruction to initiate heating input by the user. In the first section A1, the driving frequency of the inverter circuit is set to a predetermined first reference frequency FR1 (e.g., 120 kHz).

In addition, the duty cycle of the switching signal input to the inverter circuit in the first section A1 is increases from a predetermined first reference duty cycle DR1 (e.g., 10%) to a second reference duty cycle DR2 (e.g., 50%). That is, the noise suppressing operation is performed in the first section A1 to suppress noise generated during the initial driving of the working coil.

After the noise suppressing operation is completed, in the second section A2, the driving frequency of the inverter circuit decreases from the first reference frequency FR1 to the second predetermined reference frequency FR2.

In the third section A3, the controller 2 determines the heating frequency FH corresponding to the power level input by the user. In the embodiment of FIG. 14, the heating frequency FH (e.g., 50 kHz) is identical to the second reference frequency FR2. Also, in the third section A3, the controller 2 may perform a container detection operation for determining whether a heatable container exists above the working coil based on the resonance current value of the working coil.

In the fourth section A4, the driving frequency of the inverter circuit is maintained at the heating frequency FH, that is, the second reference frequency FR2.

Meanwhile, the duty cycle of the switching signal input to the inverter circuit in the second section A2 to the fourth section A4 is maintained as the second reference duty cycle DR2.

When the fourth section A4 ends, the driving of the working coil is stopped during the first off section OFF1.

When the first off section OFF1 ends, the second on section ON2 starts. The second on section ON2 includes a first section A1 to a fourth section A4. The driving process of the working coil in the first section A1 to the fourth section A4 included in the second on section ON2 is as same as the driving process of the working coil in the first section A1 to the fourth section included in the first on section ON1.

When the second on section ON2 ends, the driving of the working coil is stopped during the second off section OFF2.

Although not shown, the working coil is driven so that the on section and the off section appear alternately even after the second off section OFF2.

According to the embodiment shown in FIG. 14, the noise suppressing operation is performed in the first section A1 whenever each of the on sections ON1 and ON2 starts. Therefore, whenever the on section starts, noise generated due to the initial driving of the working coil is reduced compared to the related art. In addition, since the driving frequency of the inverter circuit is gradually adjusted from the first reference frequency FR1 to the heating frequency FH, noise due to a sudden change in the driving frequency does not occur.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an induction heating apparatus, comprising;
   receiving an input power level for a heating zone;
   performing a noise suppressing operation by adjusting duty cycles of switching signals input to switching elements of an inverter circuit and a driving frequency of the inverter circuit;
   determining a heating frequency corresponding to the input power level; and
   driving a working coil by providing a switching signal to each of the switching elements, based on the determined heating frequency.

2. The method of claim 1, wherein the performing of the noise suppressing operation comprises:
   setting duty cycles of switching signals, input to the switching elements belonging to a first group, to a predetermined first reference duty cycle;
   setting a driving frequency of the inverter circuit to a predetermined first reference frequency;
   providing a switching signal to each of the switching elements, based on the first reference duty cycle and the first reference frequency;
   increasing the duty cycles of the switching signals, provided to the switching elements belonging to the first group, to a predetermined second reference duty cycle; and
   decreasing the driving frequency of the inverter circuit to a predetermined second reference frequency.

3. The method of claim 2, wherein during the performing of the noise suppressing operation, setting duty cycles of the switching signals input to the switching elements belonging to a second group to a predetermined third reference duty cycle.

4. The method of claim 3, wherein the third reference duty cycle is set to a duty cycle the same as the second reference duty cycle.

5. The method of claim 1, wherein the performing of the noise suppressing operation comprises:
   setting a duty cycle of a switching signal, input to each of the switching elements, to a predetermined first reference duty cycle;
   setting a driving frequency of the inverter circuit to a predetermined first reference frequency;
   providing a switching signal to each of the switching elements, based on the first reference duty cycle and the first reference frequency;
   increasing a duty cycle of a switching signal provided to each of the switching elements to a predetermined second reference duty cycle; and
   decreasing the driving frequency of the inverter circuit to a predetermined second reference frequency.

6. The method of claim 1, wherein the determining of the heating frequency corresponding to the power level, comprises:
   comparing an output power value of the working coil with a required power value while the decreasing of the driving frequency of the inverter circuit; and
   determining a driving frequency, as the heating frequency, at a time when the output power value matches the required power value.

7. A method for controlling an induction heating apparatus having a heating zone, comprising;
   receiving information of an input power for a heating zone;
   performing a noise suppressing operation by controlling switching signals input to switching elements of an inverter circuit and a driving frequency of the inverter circuit;
   after performing the noise suppressing operation, determining a heating frequency corresponding to the input power; and
   driving a working coil corresponding to the heating zone, based on the determined heating frequency.

8. The method of claim 7, wherein the performing of the noise suppressing operation includes adjusting duty cycles of the switching signals input to the switching elements and adjusting the driving frequency of the inverter circuit.

9. The method of claim 8, wherein the performing of the noise suppressing operation comprises:
- setting duty cycles of switching signals, input to the switching elements belonging to a first group, to a predetermined first reference duty cycle;
- setting the driving frequency of the inverter circuit to a predetermined first reference frequency;
- providing a switching signal to each of the switching elements, based on the first reference duty cycle and the first reference frequency;
- increasing the duty cycles of the switching signals, provided to the switching elements belonging to the first group, to a predetermined second reference duty cycle; and
- decreasing the driving frequency of the inverter circuit to a predetermined second reference frequency.

10. The method of claim 9, wherein during the performing of the noise suppressing operation, setting duty cycles of the switching signals input to the switching elements belonging to a second group to a predetermined third reference duty cycle.

11. The method of claim 10, wherein the third reference duty cycle is set to a duty cycle the same as the second reference duty cycle.

12. The method of claim 9, wherein in response to the driving frequency is to equal the second reference frequency, the noise suppressing operation is to end.

13. The method of claim 8, wherein the performing of the noise suppressing operation comprises:
- setting a duty cycle of a switching signal, input to each of the switching elements, to a predetermined first reference duty cycle;
- setting the driving frequency of the inverter circuit to a predetermined first reference frequency;
- providing a switching signal to each of the switching elements, based on the first reference duty cycle and the first reference frequency;
- increasing a duty cycle of a switching signal provided to each of the switching elements to a predetermined second reference duty cycle; and
- decreasing the driving frequency of the inverter circuit to a predetermined second reference frequency.

14. The method of claim 7, wherein the determining of the heating frequency corresponding to the input power, comprises:
- comparing an output power value of the working coil with a required power value while the decreasing of the driving frequency of the inverter circuit; and
- determining a driving frequency, as the heating frequency, at a time when the output power value matches the required power value.

* * * * *